United States Patent [19]

Schinski

[11] Patent Number: 4,654,085

[45] Date of Patent: Mar. 31, 1987

[54] ADDITIVE FOR CEMENTITIOUS COMPOSITIONS

[75] Inventor: Erhard Schinski, Erkrath, Fed. Rep. of Germany

[73] Assignee: Henkel Kommanditgesellschaft auf Aktien, Duesseldorf, Fed. Rep. of Germany

[21] Appl. No.: 774,842

[22] Filed: Sep. 11, 1985

Related U.S. Application Data

[63] Continuation-in-part of Ser. No. 659,592, Oct. 11, 1984, abandoned.

[51] Int. Cl.$^4$ .......................... C04B 24/34; C04B 7/02
[52] U.S. Cl. ......................................... 106/93; 106/90; 106/314; 524/2; 524/42; 524/45
[58] Field of Search .......................... 106/93, 90, 314; 524/42, 43, 44, 45, 2

[56] References Cited

U.S. PATENT DOCUMENTS

| | | | |
|---|---|---|---|
| 3,847,630 | 11/1974 | Compernass et al. | 106/90 |
| 4,043,827 | 8/1977 | Bernett | 106/92 |
| 4,082,563 | 4/1978 | Ellis et al. | 106/90 |
| 4,363,667 | 12/1982 | Birchall et al. | 106/90 |

FOREIGN PATENT DOCUMENTS 2910374  9/1980  Fed. Rep. of Germany ........ 524/43

Primary Examiner—William R. Dixon, Jr.
Assistant Examiner—A. Knab
Attorney, Agent, or Firm—Ernest G. Szoke; Henry E. Millson, Jr.

[57] ABSTRACT

An additive for cementitious compositions is provided comprised of a cellulose ether, a starch ether and a polyacrylamide. This additive, when added to cementitious compositions, improves the workability of the resulting cementitious composition when used as a tile grout or mortar.

27 Claims, No Drawings

ADDITIVE FOR CEMENTITIOUS COMPOSITIONS

This application is a continuation-in-part application of U.S. application Ser. No. 659,592, filed Oct. 11, 1984, abandoned.

BACKGROUND OF THE INVENTION

1. Field of the Invention

This invention relates to an improved additive for use in cementitious compositions. More particulary, this invention relates to an additive comprised of a cellulose ether, a starch ether, and a polyacrylamide. The additive can be added to a cementitious composition to improve the properties thereof.

2. Background of the Related Art

U.S. Pat. No. 4,021,257 to Bernett discloses a cementitious composition which comprises 25 to 100% Portland cement and from 0.001 to 0.25% of certain long-chain organic polymers having a Flocculation Index of less than 0.5. Among the long-chain organic compounds disclosed in the patent are polyacrylamides and alum hydroxyalkyl starch. The examples of the patent are limited to the use of either a hydroxyalkyl starch or a polyacrylamide.

U.S. Pat. No. 4,447,267 to Chesny, Jr. et al. discloses dry-set Portland cement based grout compositions having less than 75% by weight Portland cement, filler, bentonite clay, and no more than about 0.35% by weight of a composite of a cellulose ether and a long-chain polymer such as polyacrylamide. The patent discloses that the preferred embodiments of that invention are improved grout compositions over the previous grouts developed in U.S. Pat. Nos. 4,021,257 to Bernett and 4,043,827 to Bernett.

U.S. Pat. No. 3,847,630 to Compernass et al. discloses a method for the production of a water-permeable porous concrete in which a macromolecular water-soluble compound is employed either a plant gum, starch, cellulose ether or a synthetic polymer such as polyacrylamide.

U.S. Pat. No. 4,363,667 to Birchall et al. discloses a cementitious composition in which at least one polymeric water soluble or water dispersible additive is employed. Such additive includes cellulose ethers; amide containing polymers such as copolymers of acrylamide; polyoxyalkylene oxide derivatives or hydrolyzed vinyl acetate polymers.

U.S. Pat. No. 4,082,563 to Ellis et al. discloses a mortar composition containing at least one water soluble high molecular weight polymer, such as cellulose ethers or polymers of polyvinyl alcohol or polyacrylamide.

There is a continuing need in the art for a cementitious composition which has improved anti-sag characteristics and yet which also has a long open time, i.e. a composition which will adhere to and support a tile when it is set in the composition but which will not set so fast so as to preclude either a long interval between application of the cementitious composition and placement of the tile or the adjustability of the tile once initially placed in the composition.

SUMMARY OF THE INVENTION

This invention relates to a composition useful as an additive in cementitious compositions comprising (a) a cellulose ether, (b) a starch ether, and (c) a polyacrylamide. The preferred compositions are those wherein the weight ratios of cellulose ether to starch ether to polyacrylamide range from 95-75:20-5:1, respectively. This invention also relates to a cementitious composition comprising a hydraulic cement and an amount of the additive described above sufficient to improve both the anti-sag characteristics and the open time of the above composition.

Also provided is a method of improving the anti-sag and open time characteristics of a cementitious composition comprising mixing an effective amount of the above additive with a composition containing a hydraulic cement and methods of setting tile with such cementitious compositions.

The additives of this invention are useful in preparing cementitious compositions which exhibit improved anti-sag characteristics with longer open times and better adjustabilities than commercially used cementitious compositions.

DETAILED DESCRIPTION OF THE INVENTION

The additives of the present invention are comprised of three essential components: a cellulose ether, a starch ether and a polyacrylamide.

The cellulose ethers useful in the additives of this invention are the products of the etherification of cellulose with a variety of etherifying agents. Cellulose is a naturally occurring, high polymeric carbohydrate composed of anhydro-glucose units. Cellulose is etherified by the reaction of the free hydroxyl groups of the anhydro-glucose units with etherifying agents. The common etherifying agents useful to prepare a cellulose ether are alkyl halides and alkylene oxides.

Examples of cellulose ethers include alkyl cellusoes, e.g. methyl cellulose, ethyl cellulose, and propyl cellulose, hydroxyalkyl celluloses, e.g. hydroxyethyl cellulose, and hydroxypropyl cellulose, mixed alkyl derivatives, e.g. methylethyl cellulose, methylpropyl cellulose, and ethylpropyl cellulose, mixed hydroxy alkyl celluloses, e.g. hydroxyethylhydroxypropyl cellulose, hydroxypropylhydroxyethyl cellulose, and mixed alkyl and hydroxyalkyl derivatives, e.g. methylhydroxypropyl cellulose, hydroxypropylmethyl cellulose, methylhydroxyethyl cellulose, hydroxyethylmethyl cellulose, propylhydroxypropyl cellulose, hydroxypropylpropyl cellulose, and the like. The preferred cellulose ethers are methylhydroxypropyl cellulose and methylhydroxyethyl cellulose.

The molecular weight and molar substitution of the cellulose ether are not narrowly critical. Preferred cellulose ether derivatives will yield 2% aqueous solutions having Brookfield viscosities (20 rpm at 20° C.) from 3,000 cP to 40,000 cP, more preferably from 4,000 cP to 30,000 cP and most preferably from 6,000 cP to 20,000 cP. Particularly preferred cellulose ethers are high molecular weight alkylhydroxyalkyl celluloses. The preferred high molecular weight celluloses will yield a 2% aqueous solution having a Brookfield viscosity of about 10,000 cP or greater, more preferably about 15,000 cP or greater.

The degree of alkyl substitution (D.S.) and the degree of hydroxyalkyl molar substitution (M.S.) are not narrowly critical. As D.S. is defined as the number of etherified hydroxyl groups in the product per anhydro-glucose unit and there are 3 hydroxyl groups per anhydro-glucose unit, the theoretical D.S. can be no more than 3. The preferred degree of methoxyl substitution ranges from about 0.9 to about 3, more preferably from about 1.5 to about 2.5, and most preferably from about 1.7 to about 1.9. As the oxyalkylating agents, such as ethylene oxide and propylene oxide are capable of adding to an already hydroxyalkyl substituted position, there is no theoretical limit to M.S. as there is to D.S. The preferred degree of hydroxyalkyl molar substitution ranges (M.S.) from about 0.05 to 4, more desirably 0.05 to 0.9, more preferably from 0.075 to 0.025, and most preferably from about 0.1 to about 0.2.

The most preferred cellulose ethers are a methylhydroxypropyl cellulose having a methoxyl degree of substitution of about 1.8, a hydroxypropyl degree of molar substitution of about 0.11, and yielding a 2% aqueous solution having a Brookfield viscosity of about 20,000 cP, and a methylhydroxyethyl cellulose having a methoxyl degree of substitution of about 1.8, a hydroxyethyl degree of molar substitution of about 0.11 and a 2% aqueous solution having a Brookfield viscosity of about 6,000 cP.

The starch ether component of the additives of this invention is obtained by etherifying starch. Starch is a naturally occurring, high-polymeric carbohydrate composed of glucopyranose units joined together by alpha-glucosidic linkages. It is commercially extracted from grains (corn, sorghum, wheat, rice) from roots or tubers (potato, cassava or tapioca, arrowroot) and from the pith of the sago palm. The approximate formula is $(C_6H_{10}O_5)_n$, where (n) is probably greater than 1000. Starch occurs in the form of white granules, usually made up of both linear polymer, (amylose) and a branched polymer (amylopectin). The granules are organized mixtures of the two types of polymers so oriented and associated in a crystal-like lattice that they are insoluble in cold water and are comparatively resistant to naturally occurring hydrolytic agents such as enzymes.

Starch is etherifyed by the reaction of the free hydroxyl groups with etherifying agents. Examples of starch ethers include: alkyl starches, e.g. methyl starch ethyl starch, propyl starch; hydroxyalkyl starches; e.g. hydroxyethyl starch and hydroxypropyl starch; mixed alkyl starch ethers, e.g. methylpropylstarch, mixed hydroxyalkyl starch ethers, mixed hydroxyalkylalkyl starch ethers, e.g. hydroxypropyl methyl starch; and mixed alkylhydroxyalkyl starch ethers, e.g. methyl hydroxypropyl starch. The preferred starch ethers are hydroxyalkyl starch ethers, the most preferred being hydroxypropyl starch.

The molar substitution of the starch ether is not narrowly critical. The degree of hydroxyalkyl molar substitution is not narrowly critical. The preferred degree of hydroxyalkyl molar substitution ranges from about 0.35 to 1.4, more preferably from 0.5 to 0.9, and most preferably about 0.7.

The cellulose ethers and starch ethers useful in the present invention are prepared by reacting either cellulose or starch with etherifying agents in the presence of an alkali catalyst. Because polysaccharides such as cellulose and starch may degrade in the presence of alkali, the time and temperature of the etherification reaction should be controlled to avoid significant degredation of the polysaccharide chains of the cellulose and starch.

The third essential component of the additives of this invention are polyacrylamide polymers. The polyacrylamides useful in this invention are homopolymers of polyacrylamide or copolymers of polyacrylamide with another ethylenically unsaturated monomer. Examples of other ethylenically unsaturated monomers include acrylic acid, acrylonitrile and the like. The polyacrylamides can be nonionic, anionic or cationic. The anionic polyacrylamides are copolymers from acrylamide and acrylic acid salts, particularly sodium salts. The cationic polyacrylamides are copolymers from acrylamide and esters having amino groups, or amides of acrylic acids having amino groups.

The preferred polyacrylamides are high molecular weight poyacrylamides that are both acidic and anionic. The most preferred polyacrylamides are available from American Cyanamid under the trade name Superfloc.

The acrylamide polymers useful in the present invention may be prepared by the free radical polymerization of acrylamide with or without another ethylenically unsaturated comonomer. A chain-terminator, along with the choice of polymerization catalyst and polymerization temperature, may be used to control the molecular weight of the polyacrylamide polymers.

The additives of the present invention are useful in cementitious compostions which also contain a hydraulic cement. The preferred hydraulic cement is Portland cement. Portand cement is made by mixing and grinding a calcareous material such as limestone or chalk with argillaceous one, such as clay or shale containing $Al_2O_3.SiO_2$ at about 1350° C. to 1800° C. until it begins to vitrify. The clinker so produced is pulverized, mixed with some 2% of gypsum and ground to about 200 mesh. The composition usually contains about 62–67% by weight of CaO, 18–20% of $Al_2O_3$, usually some 2–3% of Fe and about 1–4% of Mg together with traces of impurities.

In addition to hydraulic cement and the additives of this invention, the cementitious compositions of this invention may also contain relatively inert fillers such as sand, fine limestone or marble dust and other functional additives.

The additives of the present invention are generally used by dry mixing an amount of the additive with the hydraulic cement and any optional filler. The amount of additive used is not narrowly critical but should be sufficient to provide the desired degree of sag resistance and the desired open time of the mortar or grout. Generally, the additive will be added to the mortar in an amount from about 0.05% to about 1.5% by weight of the dry mixture of hydraulic cement and other substantial additives. Preferably the additive is used in an amount from about 0.1% to about 1.0% and most preferably from about 0.2% to about 0.5% by weight of the dry cementitious composition. Because the amount of polyacrylamide in the additive is generally about 1% by weight of the cementitious additive (i.e. the total weight of cellulose ether, starch ether and polyacrylamide), the percentage of polyacrylamide by weight of the dry cementitious composition (i.e. the total weight of hydraulic cement, filler, and additives) ranges from about 0.0005% to about 0.015%, more preferably from about 0.001% to about 0.010% and most preferably from about 0.002% to about 0.005% by weight of the dry cementitious composition.

The primary uses of the cementitious compositions of this invention are as pointing compounds and/or as mortar compounds. In the setting of ceramic tile, the customary procedure employed is to fill the areas, i.e. joints, between the adjacent tiles with a bonding material. The material used to fill the joints is referred to as a pointing compound or, as more commonly known, a tile grout. Grout, in general, and dry-set Portland cement grout in particular, desirably have the properties of strength, stain resistance and workability. Such grout should be easy to clean from the wall and should easily facilitate the dressing of the joints to achieve a satisfactory esthetic appearance.

makes the conditions of these tests more rigorous than commercially encountered field conditions.

TABLE I

| EXAMPLE | CELLULOSE ETHER (g) | STARCH ETHER (g) | POLYACRYAMIDE (g) | PLEXIGLASS TILE OPEN TIME (min.) | SAG ON PLEXIGLASS SUBSTRATE (mm) |
|---|---|---|---|---|---|
| 1 | 4.455 | 0.5 | 0.045 | 10 | 1.0 |
| 2 | 4.26 | 0.67 | 0.07 | 10 | 0.5 |
| 3 | 4.30 | 0.68 | 0.02 | 10 | 1.5 |
| 4 | 4.19 | 0.74 | 0.07 | 5 | 0 |
| 5 | 4.23 | 0.75 | 0.02 | 10 | 0.5 |
| 6 | 4.68 | 0.25 | 0.07 | 5 | 1.0 |
| 7 | 4.73 | 0.25 | 0.02 | 5 | 2.5 |
| 8 | 4.65 | 0.27 | 0.08 | 5 | 1.0 |
| 9 | 4.70 | 0.27 | 0.03 | 5 | 1.5 |
| 10 | 4.70 | 0.27 | 0.03 | 5 | 2.0 |
| 11 | 4.68 | 0.25 | 0.07 | 5 | 1.0 |

Cementitious compositions of this invention may also be used as a mortar wherein the compositions are applied to a surface as a thin layer in which ceramic tile is subsequently set. It is one of the advantages of the present invention that the cementitious compositions of this invention have improved anti-sag characteristics while retaining relativly long open times. For example, wall tile set in a mortar made from the cementitious compositions of this invention will have less of a tendency to sag even though the mortar is slower in setting which allows one to cover a greater area with the mortar before having to set the tiles and which allows one to adjust the tiles for a longer time after they are initially placed on the mortared surface.

EXAMPLES 1-11

A series of cementitious compositions were prepared by mixing 418 grams Portland Cement (Type I), and 597.0 grams Fisher S-151 sand (80-120 mesh washed sand) with the indicated amounts of (a) cellulose ether which was a glyoxal retarded methylhydroxyethylcellulose having a methyl D.S. of about 1.8 and a hydroxyethyl M.S. of about 0.11 and a 2% aqueous solution Brookfield viscosity of about 6,000 cP, (b) a starch ether which was a hydroxypropyl starch having an M.S. of about 0.7 available as Amylotex 8100 and (c) a polyacrylamide which was an acidic anionic polyacrylamide available as Superfloc A130 from American Cyanamid.

The resulting dry mix was then stirred with about 230 grams of deionized water to yield a tile mortar which was allowed to slake 5 minutes before testing.

The open time of the samples were determined by trowelling the samples out onto a horizontal slab of ASTM approved ½" gypsum wall board. Clean 2" squares of plexiglass were then placed on the mortar at 5 minute intervals, pressed with a several kilogram weight for 30 seconds and then lifted from the mortar. The percentage of the area of the square covered by adhered tile mortar was recorded. The time at which a tested square has slightly less than 50% of its surface covered by the tile mortar is defined as the open time.

The sag resistance was measured by trowelling a layer of the mortar onto a horizontal sheet of plexiglass and setting 4" square ceramic (Type B) tiles in the mortar. The sheet was then set in a vertical position and the sag of the tiles measured and reported in mm.

The use of plexiglass tiles and a plexiglass substrate in the open time and sag resistance tests, respectively,

EXAMPLE 12

A comparative example of a tile mortar of this invention versus a tile mortar prepared with a commercially available additive available from Dow as Methocel ® 228 which is comprised of a methylhydroxypropyl cellulose having a methoxyl degree of substitution of 1.7-1.9 and a propoxyl degree of molar substitution of 0.1-0.2 and will yield a 2% aqueous solution having a Brookfield viscosity of about 4,000 cP. In the first comparative, 66.27 g of Portland Cement (Type I) and 132.53 g of sand (60-120 mesh) was dry mixed with either (a) 1.20 g of a mixture of 89% by weight of the cellulose ether of Examples 1-11, 10% by weight of the starch ether of Examples 1-11 and 1% by weight of the polyacrylamide of Examples 1-11 or (b) 1.20 g of Methocel 228. Each resulting dry mixture was mixed with 50.0 g deionized water, allowed to slake and subjected to the sag test of Examples 1-11. The formulation with the Dow additive was visibly thinner before application and slid completely off the plexiglass tile in less than 8 minutes while the tile adhered by the formulation of this invention showed no perceptible sag in 8 minutes.

A second test was run reducing the water in the Dow formulation to 48.00 g. The resulting mortars had similar consistencies, but the Dow formulation still slid off the plexiglass at a time when the formulation of this invention displayed no perceptible sag.

EXAMPLE 13

Another series of Examples of the formulations of this invention was prepared by dry mixing 99.5 g of Portland Cement (Type I), 199 g sand (80-120 mesh) and about 1.5 g of a mixture of about 89% of a cellulose ether (a glyoxal retarded methylhydroxypropyl cellulose having a methoxyl D.S. of about 1.67 and a hydroxypropoxy M.S. of about 0.106 and a 2% aqueous solution Brookfield viscosity of about 20,000 cP), about 10% of the starch ether used in Examples 1-11 and about 1% of the polyacrylamide used in Example 1-11. These dry mixtures were added to 76.5 g of deionized water to make a series of tile mortars. These tile mortars were subjected to the open time and sag tests described above. The average sag was 0.79 mm (1/32"). The average coverage of the plexiglass tile tested at 5 min. was 85% which indicates an open time in excess of 5 min.

What is claimed is:

1. A composition useful as an additive to impart sag resistance in cementitious compositions, said additive comprising:
   (a) a cellulose ether,
   (b) a starch ether, and
   (c) a polyacrylamide
wherein the weight ratios of cellulose ether, starch ether and polyacrylamide range from 95–75:20–5:1.

2. A compostion in accordance with claim 1 wherein the weight ratio ranges from 90–85:15–10:1.

3. The composition in accordance with claim 2 wherein the weight ratio is 89:10:1.

4. A composition in accordance with claim 1 wherein the cellulose ether will yield a 2% aqueous solution having a Brookfield viscosity of about 10,000 cP or greater.

5. A composition in accordance with claim 4 wherein the cellulose ether will yield a 2% aqueous solution having a Brookfield viscosity of about 15,000 cP or greater.

6. A composition in accordance with claim 5 wherein the cellulose ether will yield a 2% aqueous solution having a Brookfield viscosity of about 20,000 cP or greater.

7. A composition in accordance with claim 1 wherein the cellulose ether is an alkylhydroxyalkyl cellulose.

8. A composition in accordance with claim 7 wherein the cellulose ether has an alkyl D.S. of from about 0.9 to about 3 and a hydroxyalkyl M.S. of from about 0.05 to about 4.

9. A composition as defined in claim 8 wherein the hydroxyalkyl M.S. is from about 0.05 to about 0.9.

10. A composition in accordance with claim 8 wherein the alkyl D.S. ranges from about 1.7 to about 1.9 and the hydroxyalkyl M.S. ranges from about 0.1 to about 0.2.

11. A composition in accordance with claim 8 wherein the cellulose ether is a methylhydroxypropyl cellulose.

12. A composition in accordance with claim 11 wherein the cellulose ether will yield a 2% aqueous solution having a Brookfield viscosity of about 20,000 cP.

13. A composition in accordance with claim 8 wherein the cellulose ether is a methylhydroxyethyl cellulose.

14. A composition in accordance with claim 13 wherein the cellulose ether yields a 2% aqueous solution having a Brookfield viscosity of about 6,000 cP.

15. A composition in accordance with claim 1 wherein the starch ether is an hydroxyalkyl starch.

16. A composition in accordance with claim 15 wherein the starch ether has an hydroxyalkyl M.S. of from about 0.5 to about 0.9.

17. A composition in accordance with claim 15 wherein the starch ether is hydroxypropyl starch.

18. A composition in accordance with claim 1 wherein said polyacrylamide is selected from the group consisting of anionic, cationic and non-ionic polyacrylamide polymers.

19. A composition in accordance with claim 1 wherein the polyacrylamide is a high molecular polyacrylamide that is both acidic and anionic.

20. A method of improving the anti-sag charactistics of a cementitious composition comprising mixing an effective amount of the additive of claim 1 with a composition containing a hydraulic cement.

21. A method in accordance with claim 20 wherein the effective amount of the additive is from about 0.05 to about 1.5 percent by dry weight of the cementitious composition.

22. A method in accordance with claim 21 wherein the effective amount is from about 0.2 to about 0.5 percent.

23. A cementitious composition comprising a hydraulic cement and an amount of the additive of claim 1 sufficient to improve the sag characterisitics of the cementitious composition when used as a grout or mortar.

24. A composition in accordance with claim 23 further comprising an amount of water sufficient to form a grout or mortar useful in setting tile.

25. A method of setting tile comprising contacting a tile and a substrate with an amount of the cementitious composition of claim 24 sufficient to set the tile.

26. A method in accordance with claim 25 wherein the cementitious composition is first applied to a surface and the tile is then set in the cementitious composition.

27. A method in accordance with claim 26 wherein tiles are spaced in relation to one another and the cementitious composition is applied to the areas between adjacent tiles.

* * * * *